Nov. 16, 1937.   F. CARTLIDGE   2,099,512
CONVEYER
Filed Dec. 17, 1936   2 Sheets-Sheet 1

Inventor
Frank Cartlidge
Clarence F. Poole
Attorney

Nov. 16, 1937.    F. CARTLIDGE    2,099,512
CONVEYER
Filed Dec. 17, 1936    2 Sheets-Sheet 2
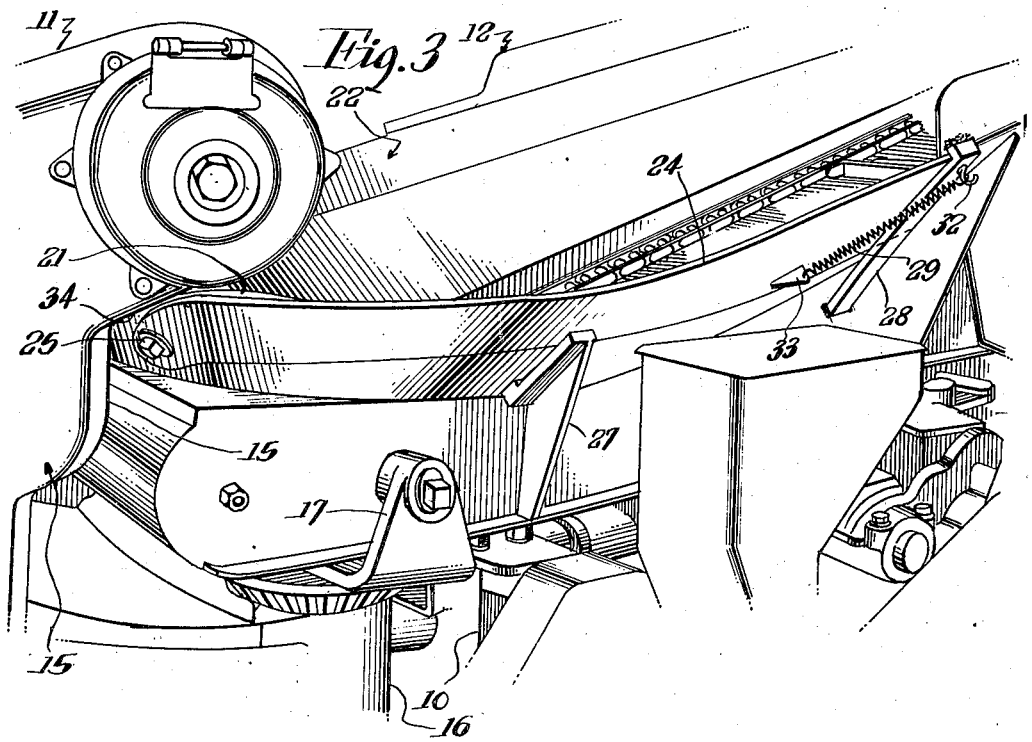
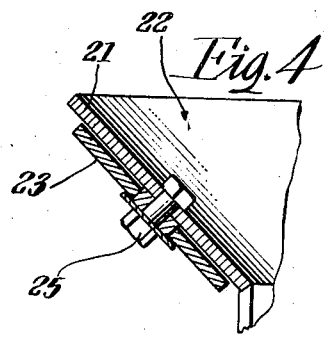
Inventor
Frank Cartlidge
Clarence F. Pole
Attorney

Patented Nov. 16, 1937

2,099,512

UNITED STATES PATENT OFFICE 2,099,512

CONVEYER

Frank Cartlidge, Chicago, Ill., assignor to Goodman Manufacturing Company, Chicago, Ill., a corporation of Illinois Application December 17, 1936, Serial No. 116,279

11 Claims. (Cl. 198—95)

This invention relates to improvements in conveyers and more particularly to improvements in conveyers having their adjacent ends in cascade relationship with respect to each other, which conveyers are particularly adapted for use with loading machines of the type operable in confined spaces such as coal mines.

One of the objects of my invention is to provide a novel construction of hopper at the receiving end of a conveyer which is overhung by an adjacent discharge end of another conveyer, the sides of which hopper are independently yieldable in a downward direction to enable one of said conveyers to be moved with respect to the other in a horizontal plane when said conveyers are disposed closely adjacent each other in a vertical direction.

Another object of my invention is to so arrange the sides of said hopper that engagement of one side by said overhanging discharge end will depress said respective side and permit the side opposite said discharge end to extend above the bottom thereof.

Still another object of my invention is to provide a simplified arrangement of conveyers having their adjacent ends in cascade relationship with respect to each other, which conveyers are of a more compact and efficient construction than formerly, especially in vertical dimensions.

Other objects of my invention will appear from time to time as the accompanying specification proceeds.

My invention may be more clearly understood with reference to the accompanying drawings wherein:

Figure 3 is an enlarged fragmentary perspective view taken from the opposite side of the machine than Figure 2; and Figure 4 is an enlarged detail vertical sectional view taken through one side of the hopper, illustrating certain details of the side wall construction.

Figure 1:
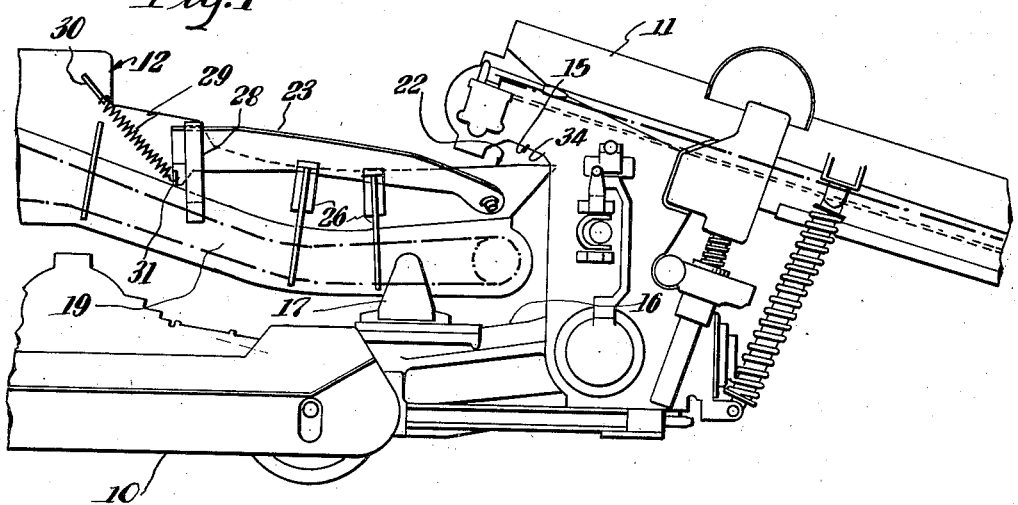
Figure 1 is a fragmentary side elevation of a loading machine illustrating one form in which my invention may be embodied.
Figure 2:
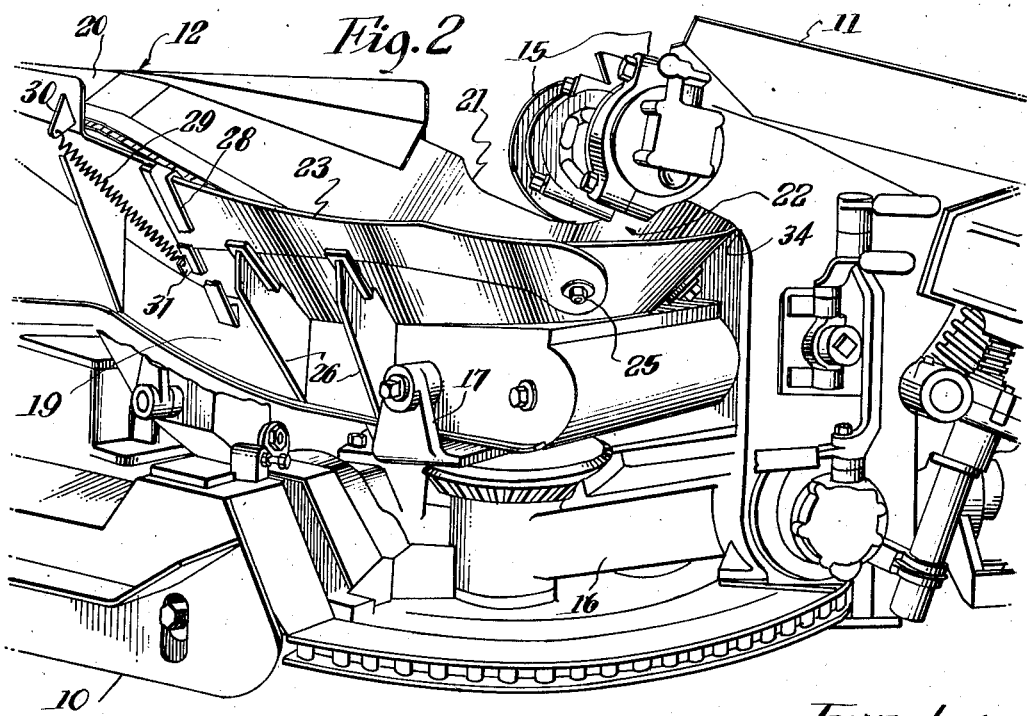
Figure 2 is an enlarged fragmentary perspective view of the loading machine shown in Figure 1.

In the drawings, the embodiment of my invention illustrated is herein shown as being incorporated in a loading machine of the track mounted type which is particularly adapted for use in gathering and loading coal in mines. Said machine is constructed along lines somewhat similar to those illustrated in a prior Patent No. 2,027,091 dated January 7, 1936, so will not herein be shown or described in detail, and includes generally a track mounted truck 10 having an elevating conveyer 11 projecting forwardly from the forward end thereof and mounted for pivotal adjustment about a vertical axis and a horizontal axis spaced above said truck and overhanging the forward end of a receiving discharge conveyer 12. Said elevating conveyer is provided with a suitable gathering and loading element at its forward end (not shown) which is adapted to gather and move material onto said elevating conveyer for discharge into the receiving conveyer 12 which extends longitudinally of the machine in a rearward direction for discharging material into suitable mine cars or the like.

The elevating conveyer 11, as herein shown, is pivotally mounted at its rear end between a pair of parallel spaced upright side frame members 15, 15 for pivotal movement with respect thereto about a horizontal transverse axis disposed adjacent its rearward end. Said side frame members extend upwardly from opposite sides of a swinging frame 16 and their upper ends project angularly rearwardly over the receiving end of the conveyer 12. Said swinging frame is mounted on the truck 10 for pivotal movement about a vertical axis, which is herein shown as being within the limits of the conveyer 12, so that the forward end of the elevating conveyer may be disposed to one side or the other of the machine.

The receiving conveyer 12 is mounted at its forward end between the ends of a forked bracket 17 for pivotal movement in a vertical plane to provide vertical adjustment for the discharge end of said conveyer. Said bracket in turn is mounted on the truck frame for pivotal movement with respect thereto in a horizontal plane to permit said conveyer to be swung from one side to the other of the truck. As herein shown, said elevating and receiving conveyers are pivotally mounted for independent movement about coaxial vertical axes in order to maintain the dimensions of the machine to the minimum requisite for operation underground.

The receiving conveyer 12 includes a conveyer frame having upright sides 19, 19 which are flared outwardly and upwardly above the top of the conveyer proper as indicated by reference character 20 to prevent material from spilling over the sides thereof. The forward portions of the outwardly flared portions 20 of the sides 19, 19 of said frame terminate into an outwardly flared retaining wall 21 which curves outwardly around the forward end of the conveyer. Said retaining wall with the sides 19, 19 of the conveyer frame forms an enlarged hopper 22 at the receiving end of said conveyer which is beneath the overhanging discharge end of said elevating conveyer and is arranged to clear the under and rearward sides of the rearward projections of the upright side frame members 15, 15 to permit pivotal movement of said conveyers with respect to each other.

Referring now in particular to the novel construction of the hopper at the receiving end of the conveyer 12 and the arrangement whereby its depth opposite the discharge point of said elevating conveyer may be maintained as the conveyers are pivotally moved with respect to each other without increasing the distance between the conveyers in a vertical direction, side walls 23, and 24 are pivoted to the forward portion of the flared retaining wall 21 of the hopper 22 adjacent opposite sides of the conveyer. Said side walls are each of a similar construction and conform generally to the form of said flared retaining wall and extend rearwardly therealong from their point of pivotal connection thereto. As herein shown, each of said side walls is pivotally mounted on said outwardly flared retaining wall by means of a nut and bolt 25 to permit independent pivotal movement of said side walls in an upward or downward direction in planes parallel to the planes of the flared retaining wall 21.

The side wall 23 is guided intermediate its ends in a pair of parallel spaced guide brackets 26, 26 secured to the sides 19 of said conveyer and extending angularly outwardly therefrom in parallel relationship with respect to the retaining wall 21 while the side wall 24 is guided in a similar guide bracket 27. The rearward ends of the side walls 23 and 24 are each guided in a guide formed by guide strips 28, 28. Each of said guide strips is secured to an opposite side of the side wall 21 and spaced therefrom in parallel relation with respect thereto to form a guide extending parallel to said side wall.

Means are provided to hold each of said side walls in an upwardly extended position with respect to said hopper which comprises tension springs 29, 29. As herein shown, one spring 29 is connected to a projection 30 extending outwardly from an outwardly flared side 20 and at its opposite end to a projection 31 extending outwardly from the bottom of the side wall 23 adjacent the rearward end thereof. The other spring 29 is interposed between a hook 32 projecting outwardly from the upper end of the guide strip 28 and a projection 33 projecting from the lower side of said side wall.

It will be apparent from the foregoing that when one conveyer or the other is pivotally moved in a horizontal direction a certain predetermined distance that an under side 34 of one upright side frame member 15 will engage the top of one of the side walls 23 or 24 depending upon the direction of movement of the conveyer for depressing the respective side wall to permit free turning movement of said conveyers with respect to each other. Thus during such turning movement the side wall opposite the depressed side wall will be in an upwardly extended position which will retain the depth of the hopper opposite the discharge point of said discharge conveyer and thus permit said conveyers to be disposed closely adjacent each other without sacrificing depth of said hopper and without increasing the vertical dimensions of the machine.

While I have herein shown and described one form in which my invention may be embodied, it will be understood that the construction thereof and the arrangement of the various parts may be altered without departing from the spirit and scope thereof. Furthermore, I do not wish to be construed as limiting myself to the specific embodiment illustrated, excepting as it may be limited in the appended claims.

I claim as my invention:

1. In a conveying mechanism, two conveyers having their adjacent ends in cascade relationship, the receiving conveyer having upwardly extending walls forming a hopper, the discharge conveyer being mounted for lateral pivotal movement toward opposite sides of said hopper, and extensions extending along the sides of said hopper walls depressible by engagement with the discharge conveyer when the latter is swung to one side or the other of said hopper.

2. In a conveying mechanism, two conveyers having their adjacent ends in cascade relationship, the receiving conveyer having upwardly extending walls forming a hopper, the discharge conveyer being mounted for lateral pivotal movement toward opposite sides of said hopper, and yieldable extensions on the sides of said hopper walls depressible by engagement with the discharge conveyer when the latter is swung to one side or the other of said hopper.

3. In a conveying mechanism, two conveyers having their adjacent ends in cascade relationship, the receiving conveyer having upwardly extending walls forming a hopper, the discharge conveyer being mounted for lateral pivotal movement toward opposite sides of said hopper about an axis disposed within the limits of said hopper, and extensions extending upwardly and along the sides of said hopper walls and depressible by engagement with the discharge conveyer when the latter is swung to one side or the other of said hopper.

4. In a conveying mechanism, two conveyers having their adjacent ends in cascade relationship, the receiving conveyer having upwardly extending walls forming a hopper, the discharge conveyer being mounted for lateral pivotal movement toward opposite sides of said hopper, and extensions extending upwardly and along the sides of said hopper walls and depressible by engagement with the discharge conveyer when the latter is swung to one side or the other of said hopper comprising side walls pivotally mounted adjacent opposite sides of the forward end of said hopper and extending rearwardly therealong.

5. In a conveying mechanism, two conveyers having their adjacent ends in cascade relationship, the receiving conveyer having upwardly extending walls forming a hopper, the discharge conveyer being mounted for lateral pivotal movement toward opposite sides of said hopper, and yieldable extensions on the sides of said hopper walls depressible by engagement with the discharge conveyer when the latter is swung to one side or the other of said hopper comprising side walls pivotally mounted adjacent opposite sides of the forward end of said hopper and extending upwardly and rearwardly therealong for independent yieldable movement with respect thereto.

6. In a conveying mechanism, two conveyers having their adjacent ends in cascade relationship, the receiving conveyer having upwardly extending walls forming a hopper, the discharge conveyer being mounted for lateral pivotal movement toward opposite sides of said hopper, and yieldable extensions on the sides of said hopper walls depressible by engagement with the discharge conveyer when the latter is swung to one side or the other of said hopper comprising side walls pivotally mounted adjacent opposite sides of the forward end of said hopper and extending upwardly and rearwardly therealong for independent yieldable movement with respect thereto, and tension means for independently holding said side walls in an upwardly extended position with respect to said hopper.

7. In a conveying mechanism, two conveyers one of which is mounted for lateral pivotal movement about an axis disposed within limits of the other, one of said conveyers having a discharge end overhanging a receiving end of said other conveyer, said receiving end having upwardly extending side walls forming a hopper, and side wall extensions extending along the sides of said hopper walls depressible by engagement with the discharge conveyer when the latter is swung to one side or the other of said hopper.

8. In a conveying mechanism, two conveyers one of which is mounted for lateral pivotal movement about an axis disposed within limits of the other, one of said conveyers having a discharge end overhanging a receiving end of said other conveyer, said receiving end having upwardly extending side walls forming a hopper, side wall extensions extending upwardly along the sides of said hopper walls depressible by engagement with the discharge conveyer when the latter is swung to one side or the other of said hopper, and tension means for independently holding said side walls in an upwardly extended position with respect to said hopper.

9. In a conveying mechanism, two conveyers, both of which are mounted for lateral pivotal movement, one of said conveyers having a discharge end overhanging a receiving end of said other conveyer, said receiving end having upwardly extending walls forming a hopper, and yieldable side wall extensions extending upwardly along the side of said hopper walls depressible by engagement with the discharge conveyer when either of said conveyers is swung to one side or the other.

10. In a conveying mechanism, two conveyers, both of which are pivotally movable about a common vertical axis, one of said conveyers having a receiving end having upwardly extending walls forming a hopper and the other of said conveyers having a discharge end overhanging said hopper, and said hopper being provided with yieldable sides depressible by engagement with said overhanging discharge end upon pivotal movement of one of said conveyers with respect to the other.

11. In a conveying mechanism, two conveyers both of which are pivotally movable about a common vertical axis, one of said conveyers having a receiving end having upwardly extending walls forming a hopper and the other of said conveyers having a discharge end overhanging said hopper, and said hopper being provided with yieldable independently pivotally mounted sides depressible by engagement with said overhanging discharge end upon pivotal movement of one of said conveyers with respect to the other.

FRANK CARTLIDGE.